2,752,297

METHOD OF REMOVING HEXACHLOROCYCLO-PENTADIENE FROM IMPURITIES

Morton Kleiman, Chicago, Ill., assignor to Velsicol Chemical Corporation, a corporation of Illinois No Drawing. Application March 8, 1952,
Serial No. 275,657

3 Claims. (Cl. 202—57)

This invention relates to a method for isolating pure hexachlorocyclopentadiene from a crude mixture containing it. More specifically, the present invention relates to a process for isolating pure hexachlorocyclopentadiene from the crude mixture which results from the chlorination of cyclopentadiene with an aqueous alkaline alkali metal to hypochlorite solution.

The present process contemplates heating the aforesaid crude mixture and then removing the pure hexachlorocyclopentadiene therefrom by simple distillation.

Hexachlorocyclopentadiene, contained in the crude product resulting from the chlorination of cyclopentadiene with an alkali metal hypochlorite, can be isolated and purified only with considerable difficulty, especially on a commercial scale. The impurities which occur in said crude product boil both immediately below and immediately above the boiling point of hexachlorocyclopentadiene. Thus, very slow and careful fractionation, utilizing a very efficient fractionating column, is essential to accomplish even reasonably satisfactory separation. Fractionation by distillation to recover pure hexachlorocyclopentadiene is rendered more difficult by the fact that the crude product in its entirety boils at a quite elevated temperature at standard pressure, thereby necessitating distillation at very low pressures such as about 0.5 mm. of mercury. Even at these reduced pressures, utilizing an efficient fractionating column and a relatively high reflux ratio, the hexachlorocyclopentadiene obtained is not exceedingly pure. The fact that hexachlorocyclopentadiene boils at an intermediate point with respect to the entire crude product requires the removal of a considerable overhead fraction before the desired product can be collected. Purification of the crude product by crystallization is not feasible since hexachlorocyclopentadiene and the concomitant impurities are oils at ordinary temperatures.

The factors above discussed combine to render ordinary processes for purifying hexachlorocyclopentadiene expensive, lengthy, and technically difficult.

It is one object of the present invention to provide a a rapid, economical and efficient means for purifying hexachlorocyclopentadiene.

Another object of the present invention is to eliminate the necessity for close fractional distillation at extremely low pressures in the separation of hexachlorocyclopentadiene from its impurities.

Another object is to modify the crude hexachlorocyclopentadiene, obtained by chlorinating cyclopentadiene as aforesaid, so that the hexachlorocyclopentadiene fraction thereof will be the lowest boiling fraction and hence the first overhead fraction recovered in distillation.

Still another object is to provide a means for recovering as a relatively pure product, a greater proportion of the hexachlorocyclopentadiene contained in the crude product, Another important object is to provide a means for purifying hexachlorocyclopentadiene utilizing methods and equipment readily adaptable to large scale commercial operations.

These and other objects of the present invention will become apparent from the following specification.

The hexachlorocyclopentadiene which can be purified in accordance with the present invention is prepared by chlorinating cyclopentadiene with alkali metal hypochlorite solution. Alkali metal hypochlorites such as sodium, lithium or potassium hypochlorite are satisfactory. This general method for preparing hexachlorocyclopentadiene is known to the art. For convenience, a specific example of this preparation is presented herewith as Example I. The purification process claimed herein is not restricted to the crude product formed in accordance with the following specific example; it is applicable to any crude hexachlorocyclopentadiene product formed by chlorinating cyclopentadiene with an alkali metal hypochlorite as the chlorinating agent. This chlorination process is carried out at fairly low temperatures, such as below about 50° C., so as to prevent decomposition of hypochlorite and side reactions of cyclopentadiene.

Example I

Into a 3-liter, 3-necked flask equipped with an efficient stirrer, reflux condenser and thermometer were placed 2300 ml. aqueous, alkaline sodium hypochlorite solution (1.262 M, OCl$^-$; 0.248 M, OH$^-$; the alkaline reagent utilized was sodium hydroxide), and 33 g. freshly prepared cyclopentadiene. The contents of the flask were mixed and simultaneously cooled so as to maintain an internal temperature of about 25° C. Samples were periodically removed and analyzed for hypochlorite concentration by titrating a known volume of the aqueous phase iodometrically. The stirring was continued until the analysis remained constant showing no further reaction taking place. The reaction is substantially complete after about twenty minutes. At the end of this time stirring was discontinued and the layers of organic and inorganic material were separated. The organic fraction was dried with anhydrous MgSO$_4$ and filtered. The analysis of this product by careful fractional distillation indicated it contained 43.8% hexachlorocyclopentadiene. This analysis was obtained by fractional distillation of the organic fraction at 0.7 mm. of mercury pressure (absolute) utilizing an efficient fractionating column. The initial boiling point of the organic layer (forerun) was about 30° C. and ranged up to about 60° C. The hexachlorocyclopentadiene fraction was collected between 61° C. and 62° C. The residue boils from about 63° C. upward at this pressure. The result of such fractionation were as follows:

|   | Percent |
|---|---|
| Fore run | 32.6 |
| Hexachlorocyclopentadiene fraction | 43.8 |
| Residue | 18.0 |
| Handling loss | 5.6 |

The present invention is a method for removing hexachlorocyclopentadiene from its impurities in the crude product resulting from the chlorination of cyclopentadiene with an alkali metal hypochlorite which comprises heating said crude product and then removing substantially pure hexachlorocyclopentadiene by distillation.

The range of temperature which may be employed in the heating step is fairly broad. Temperatures as low as about 125° C. are operable. Similarly, temperatures above that point but below the decomposition temperature of hexachlorocyclopentadiene can be used. It is desirable to maintain the temperature in the range between about 125° C. and about 250° C.; whereas the preferred range from the standpoint of efficiency and rapidity is between about 150° C. and about 185° C.

The time required for the heating step, as is the case with practically every chemical reaction, necessarily varies inversely with the temperature employed. When utilizing a temperature in the lower portion of the above defined broad range, the heating time would be much longer than that desired when utilizing more elevated temperatures such as in the upper portion of the broad range indicated. The time of heating may thus vary, depending on the temperature, between about one-half minute and about seventy-five hours. In the preferred temperature range, the heating time required may vary between about five minutes and about one hour.

After the heating step, the hexachlorocyclopentadiene contained in the treated material is removed by simple distillation as the first major overhead fraction and the rest of the product remains as a much higher boiling residue. This distillation step does not require a fine fractionation in order to remove substantially pure hexachlorocyclopentadiene such as would be required in the absence of the treatment taught by the present invention. After heat treatment the hexachlorocyclopentadiene is readily removed from the remaining product. It is, of course, desirable that components other than hexachlorocyclopentadiene be not entrained with hexachlorocyclopentadiene vapors. Any distillation equipment which will substantially satisfy this requirement is satisfactory.

The distillation step is carried out in vacuo. According to a preferred method the pressure should be maintained below about 55 mm. of mercury, at which pressure pure hexachlorocyclopentadiene boils at about 145° C. The distillation can be most efficiently effected at pressures between about 1 to about 10 mm. of mercury.

The heating operation may, but need not necessarily, be conducted in a still pot under sufficient pressure to maintain the material treated in the liquid phase. At the completion of the heating step the pressure on the still pot can be diminished and the temperature adjusted so as to distill off hexachlorocyclopentadiene without requiring a transfer of the heat treated material. Alternatively, the heat treatment may be carried out in a continuous pipe heat exchanger and the time of such treatment can be accurately determined by the rate of flow and the dimensions of the exchanger. The thus treated material may then be introduced into a flash pot or still pot of stripping or distilling apparatus wherein hexachlorocyclopentadiene is collected as overhead. The heating step is preferably conducted substantially completely in the liquid phase and any equipment and pressure to accomplish this is satisfactory.

The following example showing the results of two different runs, specifically illustrates the beneficial effect of the present process.

*Example II*

Two identical aliquots of crude hexachlorocyclopentadiene prepared in accordance with Example I were subjected to heat treatment for the lengths of time and at the temperatures indicated in the following table. Analyses of these aliquots, obtained by distillation, are also shown.

| Sample | Time, Min. | Temp., °C. | Percent Forerun | Percent Hexachlorocyclopentadiene | Percent Residue | Handling Loss |
| --- | --- | --- | --- | --- | --- | --- |
| A | 15 | 165 | 4.1 | 50.0 | 45.2 | 0.7 |
| B | 10 | 175 | 0 | 50.9 | 49.1 | |

After heat treatment, as is shown in the above example, hexachlorocyclopentadiene can be removed from its impurities by simple, rapid distillation as the first substantial overhead fraction. It will be noted that the heat treatment decreases handling losses apparently by decreasing the amount of volatile material and by rendering the distillation more efficient and rapid. Likewise, a higher percentage of substantially pure hexachlorocyclopentadiene is isolated.

The amount of residue obtained in the distillation of hexachlorocyclopentadiene from the heat treated crude product is likewise increased by said heat treatment. That is to say, it was unexpectedly found that by means of this heat treatment, not only is the original forerun converted to a very high boiling residue, but also the original residual material is further converted to render it still less volatile so that after treatment there remains little if any forerun and the boiling point of the residue is sharply distinguished from the hexachlorocyclopentadiene fraction, making the recovery of hexachlorocyclopentadiene a simple matter. This is a valuable attribute of the present process, especially since this residue has a number of beneficial uses. This residue, which is a viscous highly chlorinated oil, can be used as a fireproofing agent, plasticizer, preservative impregnant and lubricant for waxes. Its nature is such as to suggest many varied and useful applications in several fields of interest.

In conclusion, the present invention will allow a rapid and economical method of producing substantially pure hexachlorocyclopentadiene without costly, difficult, and time-consuming vacuum fractional distillation. The speed and simplicity afforded by the distillation step after heat treatment substantially reduces handling losses by reducing the total amount of equipment through which the material must circulate and reside. A concomitant benefit is the increased yield of the desired pure product, and a substantially greater throughput per unit of time for equivalent plant equipment.

I claim as my invention:

1. A method of removing hexachlorocyclopentadiene from its impurities in the crude product resulting from the chlorination of cyclopentadiene with an alkali metal hypochlorite at a temperature below about 50° C., said crude product containing fractions boiling above and below the boiling point of hexachlorocyclopentadiene, which consists in heating said crude product at a temperature above about 125° C. to convert said fraction boiling below hexachlorocyclopentadiene to material boiling above hexachlorocyclopentadiene, and then subjecting said modified crude product to simple vacuum distillation and recovering substantially pure hexachlorocyclopentadiene as the first substantial overhead fraction.

2. A method of removing hexachlorocyclopentadiene from its impurities in the crude product resulting from the chlorination of cyclopentadiene with an alkali metal hypochlorite at a temperature below about 50° C., said crude product containing fractions boiling above and below the boiling point of hexachlorocyclopentadiene, which consists in heating said crude product at a temperature between about 125° C. and about 250° C. in the liquid phase to convert said fraction boiling below hexachlorocyclopentadiene to material boiling above hexachlorocyclopentadiene, and then subjecting said modified crude product to simple vacuum distillation and recovering substantially pure hexachlorocyclopentadiene as the first substantial overhead fraction.

3. A method of removing hexachlorocyclopentadiene from its impurities in the crude product resulting from the chlorination of cyclopentadiene with an alkali metal hypochlorite at a temperature below about 50° C., said crude product containing fractions boiling above and below the boiling point of hexachlorocyclopentadiene, which consists in heating said crude product at a temperature between about 150° C. and about 185° C. to convert said fraction boiling below hexachlorocyclopentadiene to material boiling above hexachlorocyclopentadiene, and then subjecting said modified crude product to simple vacuum distillation and recovering substantially pure hexachlorocyclopentadiene as the first substantial overhead fraction.

References Cited in the file of this patent

UNITED STATES PATENTS

| | | |
|---|---|---|
| 2,230,274 | Soday | Feb. 4, 1941 |
| 2,336,493 | Marks | Dec. 14, 1943 |
| 2,388,947 | Bibb et al. | Nov. 13, 1945 |
| 2,397,580 | Ward | Apr. 2, 1946 |
| 2,443,079 | Otto | June 8, 1948 |

OTHER REFERENCES

Strauss et al.: "Ber. der deut. chem. Gesell," vol. 63, p. 1884 (1930).